United States Patent [19]

Emblem et al.

[11] Patent Number: 4,897,232

[45] Date of Patent: * Jan. 30, 1990

[54] PREPARATION OF FIBRES FROM A LIQUID PRECURSOR

[75] Inventors: Harold G. Emblem, Southport; Kenneth Jones, Tyldesley; Jonathon M. Boulton, Epsom, all of England

[73] Assignee: Clinotherm Limited, West Yorkshire, England

[*] Notice: The portion of the term of this patent subsequent to Jun. 7, 2006 has been disclaimed.

[21] Appl. No.: 201,013

[22] Filed: Jun. 1, 1988

[30] Foreign Application Priority Data

Nov. 28, 1986 [GB] United Kingdom ............... 8628537

[51] Int. Cl.$^4$ .............................................. D01F 9/08
[52] U.S. Cl. .................................... 264/56; 264/29.2; 264/164; 264/210.6; 264/210.8; 264/211; 501/95; 501/127; 501/153; 252/315.01; 252/315.1; 252/315.7; 106/287.17
[58] Field of Search .................... 501/95, 127, 153; 264/29.5, 56, 61, 183, 205, 164, 211, 210.6, 29.2, 210.8; 252/315.01, 315.1, 315.7; 106/287.17

[56] References Cited

U.S. PATENT DOCUMENTS

| | | | |
|---|---|---|---|
| 3,865,917 | 2/1975 | Galasso et al. | 264/183 |
| 3,975,202 | 8/1976 | Emblem et al. | 501/127 |
| 4,320,074 | 3/1982 | Birchall et al. | 501/127 |
| 4,474,745 | 10/1984 | Ritter | 252/315.01 |
| 4,545,924 | 10/1985 | Ritter | 252/315.7 |

FOREIGN PATENT DOCUMENTS

| | | |
|---|---|---|
| 1172649 | 8/1984 | Canada . |
| 0004730 | 10/1979 | European Pat. Off. . |
| 0948132 | 1/1964 | United Kingdom . |
| 0948136 | 1/1964 | United Kingdom . |
| 0948137 | 1/1964 | United Kingdom . |
| 1009959 | 11/1965 | United Kingdom . |
| 1159658 | 7/1969 | United Kingdom . |
| 1267959 | 3/1972 | United Kingdom . |
| 1356248 | 6/1974 | United Kingdom . |
| 1360197 | 7/1974 | United Kingdom . |
| 1360199 | 7/1974 | United Kingdom . |
| 1360200 | 7/1974 | United Kingdom . |
| 1466241 | 3/1977 | United Kingdom . |
| 1481571 | 8/1977 | United Kingdom . |
| 2004263 | 3/1979 | United Kingdom . |
| 1548866 | 7/1979 | United Kingdom . |
| 1548867 | 7/1979 | United Kingdom . |
| 2017129 | 10/1979 | United Kingdom . |
| 1555456 | 11/1979 | United Kingdom . |
| 2184430 | 6/1987 | United Kingdom . |

Primary Examiner—Hubert C. Lorin
Attorney, Agent, or Firm—Oliff & Berridge

[57] ABSTRACT

A liquid precursor system for a filament comprises an aluminium halohydrate complex, a magnesium salt and an organic silicate. The stoichiometry is such that a cordierite fibre is formed on firing the filament.

2 Claims, No Drawings

PREPARATION OF FIBRES FROM A LIQUID PRECURSOR

This invention relates to the preparation of a ceramic fibre directly from a liquid phase or precursor which is caused to gel. The resultant gel is subsequently fired to form the ceramic fibre. In this specification the product obtained from the prepared gelling mixture by processes such as extruding, spinning or drawing will, in general, be referred to as a "filament" and the final fired filamentary product will be referred to as "fibre".

In general, ceramic oxide fibre precursors may be made by dissolving the appropriate metal compound or compounds in a suitable solvent together with an organic polymer which will enable a fibre to be formed from the resulting solution. This procedure is described in British Patent No. 1,360,197. According to this specification, the metal compound may be a salt or a sol and the solvent may be water. The organic polymer content should be less than 10% by weight of the metal compound, preferably 0.1-2.0% by weight and the molecular weight of the polymer should be in the range $10^3$–$10^7$. There should be little or no reaction between the metal compound and the organic polymer. British Pat. No. 1,360,199 describes the use of a polyethylene oxide in this process and British Pat. No. 1,360,200 describes the use of a polyvinyl alcohol or partially hydrolysed polyvinyl alcohol in this process. Alumina ceramic fibre precursors may be obtained by these procedures if the metal compound is an aluminium chlorhydrate or an aluminium chlorophosphate. The precursor is converted to an alumina ceramic fibre on firing. U.S. Pat. No. 4,320,074 shows that solutions giving filaments which may be converted to alumina ceramic fibres on heating may be prepared from an aluminium salt such as aluminium chlorhydrate, a filament forming organic polymer (for instance polyethylene oxide) and a mutual solvent for the aluminium salt and the polymer.

An alumina ceramic fibre precursor may also be obtained by dissolving an aluminium chlorhydrate in water, concentrating the solution until the viscosity is in the range 1505–3000 centipoise and extruding this concentrated solution into a coagulating bath, which is ethanol, isopropanol or tertiary butanol, or a mixture of acetone with either ethanol or isopropanol. The preferred aluminium chlorhydrate is $Al_2(OH)_5Cl$. This process is described in U.S. Pat. No. 3,865,917.

An object of the present invention is to provide a precursor system that does not require the addition of an organic polymer. Therefore there is less organic material to be removed during firing. Another advantage of the procedures of the present invention is that the precursor liquids do not require a coagulating bath to form a filament.

Gels for binding refractory grains may be obtained from solutions of aluminium halohydrates, preferably chlorhydrates, optionally with certain magnesium salts, in water/alcohol mixtures. The preparation of these gels is described in U.S. Pat. No. 3,975,202. The preparation of solutions containing silicon and aluminium for binding refractory grains is described in British Pat. No. 1,356,248 and in U.S. Pat. No. 3,979,215. The preparation of a solution containing silicon and aluminium in the oxide stoichiometry required for mullite and the use of this solution to bind refractory grains is described in British Pat. No. 2,004,263. All of these solutions containing aluminium and silicon are prepared by the hydrolysis of a lower alkyl silicate in the presence of an aluminium compound soluble in water and in the solvent used in the hydrolysis. U.S. Pat. No. 3,979,215 and British Pat. No. 1,356,248 also describe the preparation of solutions for binding refractory grains by the hydrolysis of a lower alkyl silicate in the presence of a magnesium salt which is soluble in water and in the solvent required for the hydrolysis reaction. All these solutions require a gel-inducing accelerator for useful binding of refractory grains. Normally, this gelation-inducing accelerator is basic. A dilute solution of ammonia, optionally containing ammonium acetate to control the pH, is usually used.

The preparation of a solution for binding refractory grains by dissolving magnesium oxide in a solution containing aluminium and silicon obtained by hydrolysing ethyl silicate in the presence of aluminium chloride is described in West German Offenlegungschrift No. 2,154,764. This solution may be gelled by treatment with a dispersion of light magnesia in a mixture of water and glycerol (1, 2, 3-trihydroxypropane).

In British Patent Application No. 2,173,179A a solution from which filaments can be drawn or a transparent gel obtained is prepared from the reaction between water, a lower alkyl silicate and an aluminium halohydrate of the general formula $Al_2(OH)_nX_{6-n}$ or a a polymer, hydrate, hydroxy complex or zirconium complex thereof, where X is Cl, Br or I and n is less than 6 in a water miscible alcohol solvent. European published Patent Application No. 0,197,686, also copending U.S. patent application No. 843,584 describe a precursor solution from which a filament may be drawn or which sets to a monolithic material, the solution being based on an aluminium halohydrate organic complex. The complex is formed from the halohydrate and a polyol. U.S. Pat. No. 4,474,745 describes the production of a spinel powder precursor from an aluminium chlorhydrate propylene glycol complex. U.S. Pat. No. 4,545,924 describes the formation of a fibre from a filament obtained from magnesium chloride hexahydrate and an aluminium chlorhydrate propylene glycol complex by acidifying with hydrochloric acid to provide a precipitated slurry and including polyvinyl alcohol as a filament-forming polymer.

According to the present invention a process for the preparation of a filament without the need for a filament-forming organic polymer or a coagulating bath comprises forming a homogeneous clear solution by dissolving in a mixture of water and a $C_1$–$C_4$ alcohol an aluminium halohydrate organic complex obtained from an aluminium halohydrate and a polyol containing two to six carbon atoms and at least two hydroxy groups, incorporating in the solution a magnesium salt and an organic silicate containing at least one $C_1$–$C_6$ organic group, evaporating solvent to cause polymerisation and drawing from the concentrated solution a clear homogeneous filament which on firing forms a ceramic cordierite fibre.

According to another aspect of the invention a homogeneous clear solution from which on concentration a clear homogeneous filament, forming a ceramic cordierite fibre on firing can be drawn, the concentrated solution subsequently setting to a clear monolithic material, is prepared by dissolving in a mixture of water and a $C_1$–$C_4$ alcohol an aluminium halohydrate organic complex obtained from an aluminium halohydrate and a polyol containing two to six carbon atoms and at least two hydroxy groups and incorporating in the solution a magnesium salt and an organic silicate containing at least one $C_1$-$C_6$ organic group.

In each aspect of the invention, the magnesium, aluminium and silicon are present in the oxide stoichiometry required for cordierite, i.e. $2MgO, 2Al_2O_3. 5 SiO_2$, that is to say the proportions of these materials are such that the drawn filaments when fired into fibres will be of cordierite as defined hereinafter. The magnesium salt should not react with the aluminium halohydrate polyol complex to give an insoluble precipitate. Magnesium chloride or magnesium nitrate are therefore preferred. There are two necessary conditions for the development of cordierite in the fired fibre (i) the oxide stoichiometry and (ii) the precursor solution up to and including setting must be clear and homogeneous without precipitated material being present.

A suitable magnesium salt is magnesium chloride hexahydrate, $MgCl_2. 6H_2O$, which is preferred because it is a well defined crystalline material. Magnesium salts of organic acids may also be used, provided that they do not react with other components to give insoluble precipitates. Magnesium acetate is one example of a suitable magnesium salt of an organic acid. If desired, it may be used in solution in acetic acid.

The preferred alcohols are $C_1$-$C_4$ monohydric alcohols, for instance ethanol or iso-propanol. Ethanol is the preferred alcohol solvent. The ethanol may be the U.K. 74 over proof I.M.S. or the U.K. 64 over proof I.M.S. (I.M.S. is industrial methylated spirit). Each of these preferred solvents is an alcohol and water mixture.

The present invention uses an aluminium halohydrate organic complex formed from an aluminium halohydrate and a polyol containing 2 to 6 carbon atoms and at least 2 hydroxy groups. The aluminium halohydrate organic complexes are formed from aluminium halohydrates as represented by the formula:

$Al_2(OH)_nX_{6-n}$ where X is Cl, Br or I and n is 1-5 and polyols selected from the group comprising:
1,2-propylene glycol
1,1,1-trimethylolpropane
1,3-butane diol
1,2,3-trihydroxypropane
2-methyl 2,4-pentanediol
2,2-dimethyl 1,3-dihydroxypropane.

The preferred aluminium halohydrate is a chlorhydrate in which n is 5. The preparation of the preferred aluminium chlorhydrate organic complexes is described in British Pat. No. 1,159,658 and in U.S. Pat. No. 3,420,932. The complexes are obtained from aluminium chlorhydrate. British Pat. No. 1,009,959 describes the preparation of aluminium chlorhydrate organic complexes by reacting an aluminium compound of the formula Al (OH) where n is 1-5 with a hydroxylic reagent selected from aliphatic alcohols containing at least two hydroxy groups, the reaction being carried out in the presence of at least sufficient water to dissolve all the aluminium compound, followed by removal of water. Aluminium chlorhydrate organic complexes may also be directly prepared from aluminium as described in British Pat. No. 1,267,959 also as in U.S. Pat. No. 3,507,859. Aluminium metal is treated with a polyhydroxy compound having 2 carbon atoms each linked to a hydroxy group (e.g. 1,2-propylene glycol) and either or both aqueous aluminium chloride and hydrochloric acid solution, then drying the resulting solution. By this procedure, complexes of the type

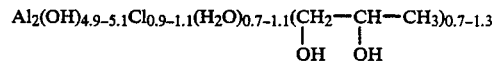

may be prepared.

The exact structure of the aluminium chlorhydrate organic complexes is not known with certainty. They may be monomers or they may be polymeric materials containing oxo links. The preferred aluminium chlorhydrate organic complexes are complexes of 1,2-propylene glycol. Organic complexes of aluminium chlorhydrate are available under the U.K. Registered Trade Mark of REHYDROL.

The lower alkyl silicates preferred in the present invention are organic silicates containing at least one $C_1$-$C_6$ alkyl group. Ethyl silicate is the preferred organic silicate. One example of a class of suitable lower alkyl silicates is the tetra [$C_1$-$C_6$ alkoxy] silanes, for instance tetraethoxysilane and tetraisopropoxysilane. The four alkoxy groups may be the same, for convenience.

The preferred lower alkyl silicate, ethyl silicate is traditionally prepared by treating tetrachlorosilane with ethanol. When anhydrous ethanol is used, the product is tetraethoxysilane (ethyl orthosilicate) $Si(OEt)_4$ with hydrogen chloride as by-product. In the industrial preparation, the ethanol used invariably contains some water (industrial spirit), hence the product obtained consists of a mixture of tetraethoxysilane and ethoxypolysiloxanes (ethyl polysilicates) which are formed by condensation - polymerisation reactions resultant on water being present and being catalysed by the hydrogen chloride by-product. Reaction conditions are chosen to yield a product which will give on ignition silica ($SiO_2$) equivalent to 40% w/w, which corresponds to a mixture of ethoxysiloxane oligomers with an average of 5 silicon atoms. This material is known as technical ethyl silicate -40, or ethyl silicate -40. It is the preferred ethyl silicate in the present invention because it contains oligomeric material which enhances filament formation. Other methods for the production of mixtures of tetraethoxysilane and ethoxypolysiloxanes are given in British Pat. No. 2,017,129; European Pat. No. 0,004,730; Canadian Pat. No. 1,172,649 and U.S. Pat. No. 4,211,717.

The preparation of isopropyl polysilicate mixtures is described in British Pat. Nos. 948,132; 948,136 and 948,137. The preparation of the other alkyl orthosilicate-polysilicate materials is described in U.S. Pat. No. 3,244,739 also in British Pat. Nos. 992,111 and 993,249.

Precursor filaments may conveniently be formed by drawing filaments from the solution. A simple method of assessing the ability of a solution to form filaments is to insert into and pull out of the solution a glass rod 10 mm in diameter. Other methods of obtaining filaments are known and these may be used if desired.

In all aspects of the invention, to be able to form filaments and/or clear coherent gels, the solution must be homogeneous. The amount of water and the amount of solvent are therefore important. The clear coherent gels and filaments may be dried and fired to remove any remaining organic material, to give monolithic materials and fibres. It is understood that during evaporation of the solvent, hydrolysis and condensation-polymerisation reactions cause a steady increase in the viscosity to occur and at a particular point, filaments can be formed from the solution; ultimately a clear and coherent gel which is rigid is obtained. Resulting from the condensation-polymerisation reaction, a volatile product, which is water or an alcohol, is eliminated and is removed during evaporation of the solvent. This allows close control of the condensation-polymerisation sequences. Drawing a filament produces a dramatic increase in the surface : volume ratio, resulting in rapid volatilisation of any remaining solvent and gelation so that the filament is coherent. Thus the stability of the drawn filament is delicately balanced on the sol : gel transition point, the success of filament formation being dependent on the homogeneous nature of the precursor solution. The reaction temperature should be 60° C. or higher, the temperature is preferably the reflux temperature of the solvent-system. Depending on the reaction temperature and the reaction time filaments may be obtained before the solution sets to a clear and coherent gel. It is important to note that the formation of filaments and/or clear coherent gels does not need the gelation-inducing accelerators necessary for binding refractory grains when using the solutions whose preparation is described in British Pat. Nos. 1,356,248 and 2,004,263, or in U.S. Pat. Nos. 3,975,202 and 3,979,215. It is also important to note that the formation of filaments and/or clear coherent gels from homogeneous solutions obtained by hydrolysing lower alkyl silicates, for instance ethyl silicate, in the presence of magnesium salts and aluminium hydroxyhalide organic complexes formed from polyols containing 2 to 6 carbon atoms and at least two hydroxy groups does not require the gelling agent comprising light magnesia dispersed in a mixture of water and glycerol described in West German Offenlegungsschrift 2,154,764.

The cordierite fibres prepared according to the invention may be regarded as magnesium aluminosilicate ceramic fibres. A description of the magnesium aluminosilicates, which include cordierite, ideally 2 MgO . 2Al$_2$O$_3$. 5 SiO$_2$, is available. (J. W. Mellor A Comprehensive Treatise on Inorganic Theoretical Chemistry Vol. VI, pp 808–815, Longmans, Green & Co. Ltd. 1947, London).

In articles such as furnace lining modules constructed from ceramic fibres fibre shrinkage is a problem. Thus the low thermal expansion of cordierite makes it a very suitable material for use in applications requiring good thermal shock damage resistance.

The preparation of cordierite precursor materials from organic silicates and solutions of magnesium alkoxides and aluminium alkoxides by precipitation methods is known (see for instance Gensse and Chowdry, Materials Research Society Symposia Proceedings, Vol. 73, 1986, pp. 693–703).

The preparation of cordierite precursor precipitated powders from solutions of aluminium and silicon alkoxides in an alcohol and a solution of magnesium acetate in acetic acid by precipitation using hydrazine hydrate is described in French Pat. No. 2,585,045. Cordierite powders and cordierite precursor powders may be dry pressed into shapes for the manufacture of electronic components.

Cordierite type materials, like silica, can have more than one crystal form. Some crystal forms of cordierite types are given in Table I, based on data given by Gensse and Chowdry (Materials Research Society Symposium Proceedings, Vol. 73, 1986, pp 693–703). The formation of cordierite crystals from an amorphous precursor powder proceeds via a stuffed β-quartz hexagonal crystal structure. Stuffed β-quartz has the crystal structure of high quartz in which some of the silicon has been substituted by aluminium. To compensate for the charge deficit, magnesium cations enter the structure ('stuffing') along the helicoidal six-fold axis. Stuffed β-quartz is not regarded as a cordierite in this specification. Examples of the cordierite materials of this specification are the μ-cordierite and alpha-cordierite materials, whose properties are given in Table I. On prolonged heating above 1350° C. μ-cordierite converts slowly to alpha-cordierite.

TABLE I

CRYSTAL FORMS OF CORDIERITE TYPE MATERIAL

| Name of Material | Space Group and Crystal Form | Remarks |
|---|---|---|
| "Stuffed" β quartz (not regarded as a cordierite in this specification) | P 622 Hexagonal | A quartz structure in which some Si is substituted by Al. To compensate for the charge defect Mg enters the structure ("stuffing") along the helicoidal six fold axis. With increase in sintering temperature transforms to u cordierite. Stability increased by excess Al. |
| μCordierite | P6/mcc Hexagonal | Formed at 950–1150° C. Is metastable, transforming slowly above 1350 C. to ° alpha-cordierite. |
| alpha-Cordierite | C ccm Orthorhombic | The high temperature form, Low symmetry. Formed by slow diffusion and redistribution of Si and Al. |

Fibres made according to the present invention may be used as thermal insulating materials, also in the construction of thermal insulating units based on fibrous materials. The cordierite ceramic fibres made according to the invention may be used to manufacture a lining element for the hot-face surface of a furnace following the procedures set out in British Pat. Nos. 1,466,241 and 1,481,571. They may also be used in the construction of the thermal insulating units and in the procedures described in British Pat. Nos. 1,548,866 and 1,548,867 also in U.S. Pat. Nos. 4,194,036 and 4,324,602. Ceramic fibres made according to the invention may also be used in the manufacture of the two-layer heat insulating liner for furnace construction which is described in British Pat. No. 1,555,459 and in U.S. Pat. No. 4,344,753. Vacuum forming techniques may be applied to the appropriate aggregated fibres.

The invention is illustrated by the following Examples:

EXAMPLE 1

37.68 g of magnesium dichloride hexahydrate crystals (corresponding to 0.185 mol (MgO) and 69.61 g of technical ethyl silicate (silica equivalent 40% by weight, corresponding to 0.464 mol SiO$_2$) were dissolved in 200 cm$^3$ ethanol and to this solution was added 50 g of the aluminium chlorhydrate propylene glycol complex sold under the Registered Trade Mark REHYDROL as REHYDROL II. (REHYDROL II has alumina equivalent 38% by weight, so 50 g REHYDROL II corresponds to 0.186 mol Al$_2$O$_3$. The solution has the oxide stoichiometry 2.00 MgO.2.01 Al$_2$O$_3$. 5.01 SiO$_2$. Cordierite requires the oxide stoichiometry 2MgO.2Al$_2$O$_3$.5SiO$_2$. 140 cm$^3$ of volatiles were removed by distillation at 60° C. under reduced pressure giving a solution from which filaments 15 cm long could be drawn. The solution gelled on standing giving a clear, coherent and rigid gel. The ethanol can conveniently be the U.K. 74 overproof industrial methylated spirit.

The filaments and gel were fired for two hours at 1000° C. Examination by X-ray diffraction showed that the filaments had formed cordierite fibres and the gel had also been converted to cordierite.

EXAMPLE 2

To 200 cm$^3$ was added 50 g of the aluminium chlorhydrate propylene glycol complex sold under the Registered Trade Mark REHYDROL as REHYDROL II, followed by 69.59 g technical ethylsilicate (silica equivalent 40% by weight) and 37.67 g magnesium dichloride hexahydrate $MgCl_2$. 6 $H_2O$ crystals. Volatiles were removed from the resulting solution by evaporation at 70° C. under reduced pressure. When the concentrated solution reached a viscosity of ca 10 poise, filaments up to 15 cm long could be prepared for a period of 2 hours, when the solution gelled to give a clear, coherent and rigid gel.

The filaments after drying at 60° C. had % C=4.9, showing few residual ethoxy groups and the occurrence of condensation-polymerisation.

When the filaments were fired at 1300° for two hours $\mu$ cordierite fibres were obtained. No trace of the "stuffed quartz" structure was observed in fired samples because the precursor is homogeous and does not contain precipitated material. If a non-homogeneous system containing precipitate is set and fired stuffed quartz may well be produced. No significant weight change due to loss of any Al, Si or Mg species was detected on firing to 1000° C. $2MgO$ . $2Al_2O_35$ $SiO_2$ requires the ratio Al:Si:Mg to be 0.77:1:0.35. The observed value was 0.69:1:1.04.

The properties of the filaments and fibres obtained are given in Table II.

The solution may be further concentrated to a viscosity greater than 10 poise. Filaments can be drawn until the solution becomes so concentrated that it gels to a clear coherent and rigid gel.

TABLE II

PROPERTIES OF FILAMENTS AND FIBRES.

| Material | Property | Remarks |
|---|---|---|
| Filament dried at 60° C. | C = 4.9% | Few residual ethoxy groups. Occurrence of Condensation - polymerisation |
| Filament fired at 1000° C. for | Al = 16.5% Si = 24.0% Mg = 8.1% | Shows no loss of Al, Si or Mg species. Confirms $2MgO \cdot 2Al_2O_35SiO_2$ Stoichiometry |
| Filament fired at 1300° C. for 2 hours | Fibre having $\mu$cordierite crystal structure formed. | No evidence for "stuffed quartz" structure. Further heating for 2 hours at 1300° C. did not form alpha cordierite. |

We claim:

1. A process for the preparation of a filament without the need for a filament-forming organic polymer or a coagulating bath, such process comprising forming a homogeneous clear solution by dissolving in a mixture of water and a $C_1$-$C_4$ alcohol an aluminium halohydrate organic complex obtained from an aluminium halohydrate and a polyol containing two to six carbon atoms and at least two hydroxy groups, incorporating in the solution a magnesium salt and an organic silicate containing at least one $C_1$-$C_6$ organic group, the magnesium, aluminium and silicon being present in an oxide stoichiometry for cordierite, evaporating solvent to cause polymerisation and drawing from the concentrated solution a clear homogeneous filament, which on firing forms a ceramic cordierite fibre.

2. A process according to claim 1 wherein the magnesium salt is magnesium chloride hexahydrate.

* * * * *